United States Patent [19]

Bertin et al.

[11] 4,418,895

[45] Dec. 6, 1983

[54] ELASTIC SUPPORTS, NOTABLY FOR VEHICLE ENGINE SUSPENSION

[75] Inventors: Jacques Bertin, Asnieres; Michel Pompeï, Paris; Jean-Pierre Valjent, Ris-Orengis, all of France

[73] Assignee: Hutchinson-Mapa, France

[21] Appl. No.: 306,522

[22] Filed: Sep. 28, 1981

Related U.S. Application Data

[63] Continuation of Ser. No. 70,113, Aug. 27, 1979, abandoned.

[30] Foreign Application Priority Data

Sep. 6, 1978 [FR] France .................................. 78 25681

[51] Int. Cl.³ .......................... F16M 5/00; F16F 15/00
[52] U.S. Cl. .................................. 267/140.1; 188/298; 248/562; 248/636; 267/141.1
[58] Field of Search ................. 188/298; 248/631, 562, 248/636; 267/35, 140.1, 140.3, 141.1, 141.2, 141.3, 141.4, 141.5, 141.6, 141.7, 152, 153, 8 R, 63 R, 64.19, 64.27; 280/712

[56] References Cited

U.S. PATENT DOCUMENTS

| | | | |
|---|---|---|---|
| 1,304,311 | 5/1919 | Heldrich | 267/35 |
| 1,915,303 | 12/1928 | Forsyth | 267/35 |
| 2,387,065 | 10/1945 | Harding | 188/298 |
| 2,822,164 | 2/1958 | Boschi | 267/140.3 |
| 3,322,377 | 3/1965 | Morlon | 267/141.6 |
| 4,199,128 | 4/1980 | van den Boom et al. | 248/562 |

FOREIGN PATENT DOCUMENTS

| | | | |
|---|---|---|---|
| 2906282 | 8/1980 | Fed. Rep. of Germany | 267/140.1 |
| 1153671 | 3/1958 | France | 267/35 |

Primary Examiner—Bruce H. Stoner, Jr.
Assistant Examiner—Robert J. Oberleitner
Attorney, Agent, or Firm—Larson and Taylor

[57] ABSTRACT

The invention relates to damped elastic supports, comprising essentially, between two bases fixable to assemblies to be supported on one another, on the one hand a flexible wall defining one chamber designed to cooperate with another chamber and, on the other hand, at least one fluid-flow restricting orifice. This assembly is also completed outwardly by two elastic domes of elastomer combined with one mass. The assembly of this mass with another mass and with the damper device and the elastic membranes is calculated so as to permit a certain flexibility to be maintained, both for low frequencies and high frequencies. The invention is particularly applicable to automobile engine supports.

12 Claims, 8 Drawing Figures

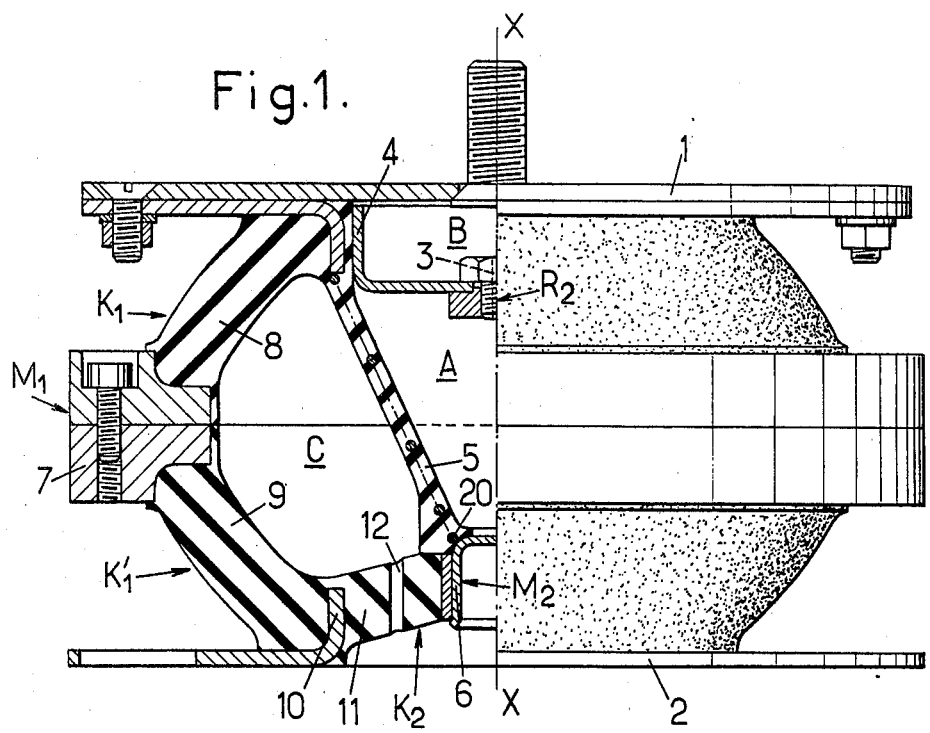
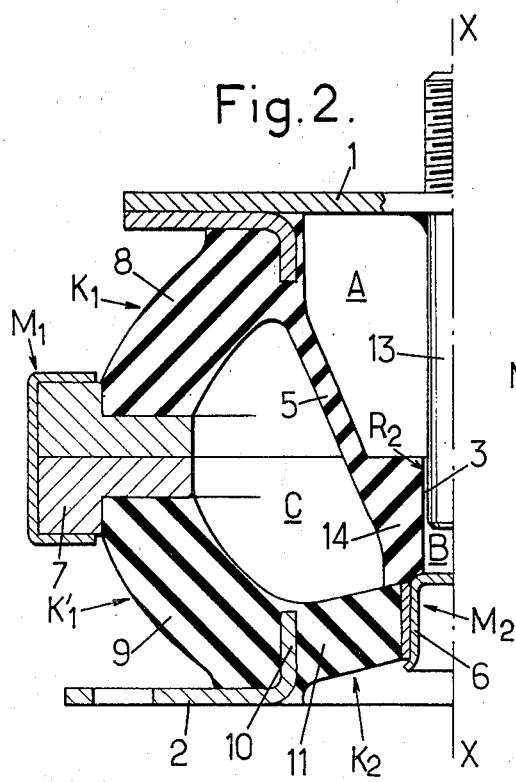
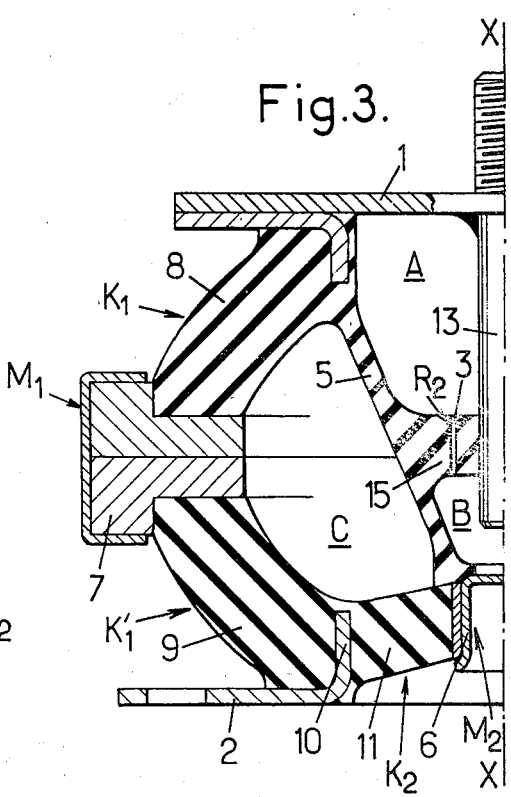

ELASTIC SUPPORTS, NOTABLY FOR VEHICLE ENGINE SUSPENSION

This is a continuation of the application Ser. No. 70,113 filed Aug. 27, 1979, now abandoned.

BACKGROUND OF THE INVENTION

1. Field of the Invention

The invention relates to elastic supports to be provided between two assemblies, such as for example a vehicle engine and the chassis of the latter (among numerous other possible applications).

2. Description of the Prior Art

Supports of this type comprise, between two plates or bases designed to be fixed respectively to said assemblies, a suitable combination of at least one spring and at least one damping device, for example with fluid- or liquid-drawing or restriction means, if necessary with one or several masses intended, by their inertia, to create a certain mechanical impedance, according to the frequencies to be damped, the one or more abovesaid springs being advantageously constituted, at least partially, by elastomeric elements.

If, as is often the case in the application to vehicle engines envisaged above, this has involved the damping, on the one hand, of oscillations of low and average frequencies, notably according to the undulations of the road, and on the other hand, higher frequencies, arising from the engine, notably at high speeds of the latter, there is the risk that the locking or binding of the damper device, which can occur at one of these frequencies, notably high frequencies, may have the effect of notably reducing the elastic flexibility of the support, which it is desirable to avoid.

It is a particular object of the invention to improve the conditions of flexibility, by attempting to maintain them at approximately constant values for various oscillatory speeds.

GENERAL DESCRIPTION OF THE INVENTION

According to the invention there is provided in a support of the type concerned, a first path between the two bases comprising a damper device and at least one spring means in series with this damper device and a second path parallel to the first path and having at least one other spring means, so that the possible momentary locking of the damper still leaves a suitable flexibility, said springs being at least partially constituted by elastomeric elements.

The invention consists, apart from this main feature, of certain other features which are preferably utilized at the same time and which will be more explicitly described below.

According to one of these features, relating to supports of the type concerned including a damper device, notably cooperating with one or several springs of the above-mentioned elastomeric type, this support is made to comprise at least two chambers of which one preferably at the center of the support and bounded by a flexible wall, with means such, that the bringing together of the two bases of the support, under the effect of oscillation, causes a reduction in the volume of one of the chambers with respect to the other and forces a fluid to pass through restricted passages of the damper device, and conversely when said bases again separate.

Said chamber, notably at the center of the support, has for example, a shape of revolution, in particular conical. To maintain its substantially conical shape and in any case to avoid its swelling outwards—which would prevent the compression of the damping fluid—there is provided, for example, in said flexible wall, an aumature or reinforcement in the form of a wire or spring, notably helicoidal.

According to another feature, relating to the case where the supports of the type concerned comprise at least one inertia mass between the two bases, notably in parallel with the damper device, this mass is constituted by a ring connected respectively to the two bases of the support by types of domes of elastomer, which are fastened to said bases or on the edges of orifices formed at the center of the latter.

The assembly of these elastomer domes can then be completed by an element also of elastomer, joining one of said domes to the base of the conical or similar wall as above-mentioned, in the case where such a wall is used, so that said elastic element plays the role of a series spring on the damper device.

The preceding assembly constitutes also an annular chamber which tends to be compressed when the two bases of the support come together.

If necessary, this chamber could be sealed and contribute thus to cooperating with the wall of the cone or the like, in combination with the damper device in any desired sense.

In the case where there is provided at least one inertia mass cooperating with the damper device and in series with this device, this mass will, for example, be provided on the side of the top of the above-mentioned cone, at the place where this cone is attached elastically to the corresponding cup.

It is observed in any case that the inertial masses, as well as the above-mentioned supports could be adjusted in any suitable manner to modify the damping conditions suitably according to the frequency, taking into account also the rigidity of the various springs.

It is intended also that any modifications can be provided by suitably arranging the relationships between the various springs and inertial masses and by eliminating certain among them.

Thus it is possible to provide at least one mass in series with the damper device, or at least one mass in parallel, or both, in combination with springs.

It is also possible to provide, in combination with a damper device connected only to one of the two bases of the support, a mass of the above-contemplated type, in combination with a spring in parallel on the damper device.

The invention is more particularly aimed at certain types of application (notably for supports for automobile vehicles), as well as certain embodiments of said features; and it is directed, more particularly again and this by way of novel industrial products, to the special elements adapted for their construction and the assemblies, notably vehicles and engines comprising such supports.

BRIEF DESCRIPTION OF THE DRAWINGS

The invention will in any case be well understood by means of the additional description which follows and the accompanying drawings, which description and drawings are, of course, given particularly by way of non-limiting indication.

FIG. 1, of these drawings, shows in section, portions in elevation, an elastic support to be interposed between two assemblies (notably a vehicle engine and its chassis, not shown), FIG. 2 shows similarly to the sectional portion of FIG. 1 a modification of the invention, FIG. 3 shows similarily to FIG. 2 another modification.

DESCRIPTION OF PREFERRED EMBODIMENTS

According to the invention, and more especially according to that of its types of application, as well as according to those embodiments of its various parts, to which it is apparent that preference should be given, in order to construct a damped support for insertion between two assemblies, notably a vehicle engine and the chassis of the latter, procedure is as follows or similarly.

There is shown in FIG. 1 of the drawings a damped elastic support corresponding to one of the embodiments of the invention, among those most developed, it being understood that it would be possible, starting from this embodiment, to conceive numerous others, by modifying the characteristics of the constituent elements.

Figure 4:
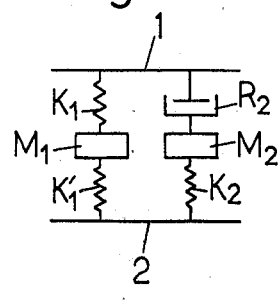
FIG. 4 is an explanatory diagram corresponding to the embodiment of FIG. 1 or of FIGS. 2 and 3, FIGS. 5 to 8 illustrate diagrammatically various other embodiments of the invention.

This support contains essentially the following elements, such as shown diagrammatically in FIG. 4, and joined respectively to the two bases 1 and 2 of the support (of which bases one if fixed, for example, to the engine and the other to the main frame):

a first unit comprising two springs $K_1$, $D'_1$ separated by a mass $M_1$ acting through its inertia, a second unit comprising a damper device $R_2$, of a type for example with fluid-flow-restricting means, a second mass $M_2$ and a spring in series $K_2$.

The rigidity of the springs, the masses $M_1$ and $M_2$ and the damper $R_2$ are selected so as to obtain the best damping for the frequencies concerned whilst ensuring suitable flexibility.

It is seen here and now that, if the damper device $R_2$ becomes blocked for a particular frequency, notably a high frequency, good flexibility will nonetheless be maintained due to the various springs in parallel $K_1$, $K'_1$ and in series $K_2$. This is already one of the advantages of the invention. There will now be demonstrated, with reference to FIG. 1, the various features of said invention.

Regarding firstly the part more specially relating to the damper device $R_2$ and to the elements $K_2$ and $M_2$ cooperating directly with it, this part is advantageously arranged at the center of support, by including with it essentially two chambers A and B, constituting the damper device $R_2$ (FIGS. 1 and 4), in combination with at least one calibrated restricting means 3 adapted to connect these two chambers of which one at least is deformable under the effect of the bringing together or the separations of the two bases 1 and 2.

One of these chambers B is, for example, constituted by a rigid part 4, notably fixed to the center of the base 1, which is shown in FIG. 1 at the upper part, whilst the other A is deformable, being constituted by a conical wall portion 5 (elastomer or other plastics material) having advantageously a shape of revolution, notably conic, around the axis X—X of the support, to which is attached, on the top side (lower part in FIG. 1), a rigid mass 6 representing the mass $W_2$ of FIG. 4.

This mass 6 ($M_2$) is on the other hand connected to the base 2 elastically (spring $K_2$ of FIG. 4), for example in the manner described below.

The chambers A and B are filled with a damping fluid (liquid or gas) one of them, notably the chamber B, being possibly only partially filled.

As regards now the part more especially relating to the mass $M_1$ and to the springs $K_1$, $K'_1$ (FIG. 4), it is constructed for example (FIG. 1):

by providing a metal ring 7, possibly in two parts to facilitate assembly, this ring forming the mass $M_1$, and by connecting this mass to the bases 1 and 2 respectively by two sorts of elastic cups 8 and 9, of elastomer, forming springs $K_1$ and $K'_1$.

In addition, the base 2 of the support having at its center an aperture defined by flange 10 between cup or dome-shaped spring means 9 and mass 5, the edges of this aperture are connected to said mass through an elastic wall of annular shape 11 which, preferably, will form a single unit with the dome 9.

The three walls 8, 9 and 11 constitute a chamber C deformable under the effect of the variations in distance between the two bases 1 and 2, and this chamber can be open to the atmosphere, for example, by means of apertures such as 12 (FIG. 1) or on the other hand be sealed, as assumed in FIG. 2.

In the first case (FIG. 1), there would be combined, with the conical wall or the like 5, means to permit, on the bringing together of the two bases 1 and 2, the bending or swelling of this wall outwards to be avoided, which would counteract the desired effect, for the expulsion of the damper fluid from the chamber A to the chamber B. These means consist, for example, of incorporating, with the wall 5, an armature 20, notably helicoidal, which is opposed to extension but which does not prevent a certain axial elasticity. It is to be noted also that the weakness of the spring thus-obtained, in parallel on the damper proper, does not substantially modify the axial and radial rigidities due to the three springs $K_1$, $K'_1$ and $K_2$ (FIG. 4).

There is hence indeed provided, by means of such an assembly, the combination of the various springs $K_1$, $K'_1$ and $K_2$ and of the masses $M_1$, $M_2$ with a damper $R_2$ (FIG. 1), functioning such that the mutual approach or separation of the bases 1 and 2 causes the passage of the damper fluid from chamber A into chamber B or reversely, this assembly being adjusted according to the frequencies of the oscillations to be damped.

In the second case contemplated above, with a sealed chamber C (which may be filled with a fluid such as air, nitrogen, water, a viscous liquid, etc.), the mutual approach of the bases 1 and 2 causes a variation in the volume of the chamber C, that is to say a compression, which compression acts suitably on the wall 5 to transfer fluid from one to the other of chambers A and B.

It is assumed, in FIGS. 2 and 3 and by way of example, that the chambers A and B are inverted, the chamber A being above and the chamber B below, the passage from one to the other still taking place through orifices or passages such as 3. It is also assumed that there is combined, with chambers A and B, a piston and cylinder assembly moving with respect to one another under the action of the relative movements of the bases 1 and 2. The cylinder may be provided at the base of the cone 5, at 14 (FIG. 2), or indeed in a transverse wall 15 separating the two chambers A and B (FIG. 3). The restricted flow passages 3 may be provided in the play between cylinder and piston (FIG. 2), or in the wall 15 (FIG. 3), or in both.

In each case, the wall 5, of elastomer or plastics material, will be made suitably (FIGS. 2 and 3), to be deformed in the direction tending to ensure the passage of fluid from A to B (or from B to A) and conversely under the effect of compression or decompression exerted on chamber C. Said conical wall or the like 5 could, in this case, be devoid of armature, so as to be inflated or deflated in the desired direction.

Whatever the embodiment adopted, the size of the outer mass ($M_1$) can be calculated so as to obtain, at a certain frequency according to the stiffness of the springs 8, 9 and 11 ($K_1$, $K'_1$ and $K_2$), a mechanical impedance which can be useful in certain cases when it is desired, for example, for this frequency, to limit the relative movement of the suspended member.

In the same spirit, it is possible to increase the value of the mass 6 ($M_2$), so as to obtain another dynamic damper which is adjusted to a frequency identical or different from that to which the mass 7 ($M_1$) is adjusted, or again so as to modify the damping conditions according to the frequency.

In any case, as indicated above, the assembly has the advantage of never eliminating the elastic function in the case of locking of the damper at a certain frequency.

Starting from the embodiments which have just been indicated, it is possible to conceive numerous others, by modifying or eliminating certain at least of the constituent elements, as shown in FIG. 4.

Thus it would be possible to use the central wall 5 for a restricted flow of fluid between the contiguous chambers, through suitably formed orifices.

It is to be noted also that the upper and lower parts of the support, notably of the domes 8 and 9, could be formed of different elastomeric materials, in order to determine to the best the values of the springs $K_1$, $K'_1$ and $K_2$ thus constituted.

Figure 5:
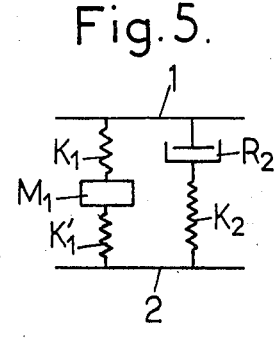
Figure 6:
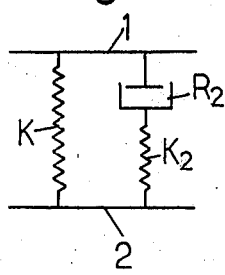
Figure 7:
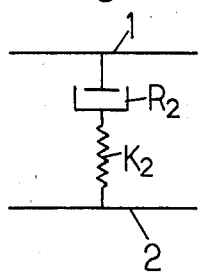
Figure 8:
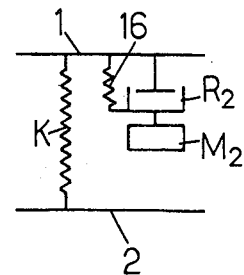

By modifying the values of the various parameters $K_1$, $M_1$, $K'_1$ and $R_2$, $K_2$ and notably by eliminating certain ones, it is possible to arrive at solutions such as the following, among others in accordance with the invention:

elimination of the mass $M_2$ according to the diagram of FIG. 5, elimination of both of the two masses $M_1$, $M_2$ (FIG. 6), use of a single spring $K_2$ in combination with a damper $R_2$, this assembly responding, as has been seen, to the preoccupations of the invention, since a jamming of the damper does not prevent the assembly from remaining flexible (FIG. 7), and combination, with a spring in parallel K, of a damper $R_2$ to which is suspended a mass $M_2$, not connected to the base 2, the damper and spring assembly being arrangeable in parallel with the spring 16 whose role would, for example, be played by a wall 5 of the above-contemplated type (FIG. 8).

In the case of FIG. 4, and more especially FIG. 5, it would be possible to obtain, by correct calculation of the springs $K_1$, $K'_1$ and $K_2$, the same rigidity of the assembly at high frequency (for which the damper $R_2$ is jammed), as at low frequency for which this damper no longer works in practice. It suffices to this effect to have the relationship:

$$K_1 = K'_1 = 2K_2$$

where $K_1$, $K'_1$ and $K_2$ denote the rigidities of the corresponding springs.

For high frequency, the damper device $R_2$ is locked. On the other hand, the mass $M_1$ then vibrates in phase opposition which tends to eliminate the elastic system $K_1$, $K'_1$.

The rigidity is thus substantially reduced to $K_2$.

For a low frequency, the spring $K_2$ is practically eliminated, since the damper $R_2$ moves freely, for this frequency.

The rigidity is then again equal to $K_2$, since the flexibilities $1/K_1$ and $1/K'_1$ are added, and one has:

$$1/2K_2 + 1/2K_2 = 2/2K_2 = 1/K_2$$

As a result of which, whatever the embodiment adopted, it is possible to construct elastic supports whose operation emerges sufficiently from the foregoing for it to be unnecessary to dwell further on the subject, and which have, with respect to those pre-existing, the practical advantage of being easily adaptable to the damping of notably different oscillation frequencies.

As is self-evident and as emerges already from the foregoing, the invention is in no way limited to those of its types of application and embodiments which have been more especially envisaged; it encompasses, on the contrary all modifications, notably those for which there is used, in certain at least of the above-mentioned chambers A, B, C, a visco-elastic liquid of known type.

We claim:

1. A damped elastic support, for insertion between two bases to be supported on one another, comprising:
   a damper device formed by first and second chambers connected by a restriction means for providing restricted flow therebetween, one of said first and second chambers comprising a rigid member affixed to one of said bases,
   a first spring means formed at least partially of elastomer, and being arranged in a path in series with the damper device between said bases so as to form a damper device-first spring means assembly,
   a second spring means arranged between said bases in a path in parallel with the path containing the damper device and first spring means, said second spring means comprising an annular shaped elastomer member which totally surrounds the assembly formed by said damper device and said first spring means and defining with said assembly, between said bases, a third chamber which is independent of said first and second chambers,
   at least one of the first and second chambers being bounded by a flexible wall having a shape of revolution such that deformation of said flexible wall, due to deformation of the said first and second spring means, causes a damper fluid to flow between the first and second chambers through the restriction means, said flexible wall being directly joined to the abovementioned rigid member and to a further rigid member and said first spring means joining said further rigid member to the other of said bases.

2. An elastic support according to claim 1, wherein the chamber enclosed by said flexible wall is located at the center of the support such that the mutual approach or separation of the two bases, under the effect of an oscillation, causes the variation of the volume of said chamber and forces the damper fluid to flow through the restriction means.

3. An elastic support according to claim 1, wherein said flexible wall is of conical shape.

4. An elastic support according to claim 1, wherein said flexible wall includes a reinforcement means tending to oppose radial deformation and thus encouraging, when the two bases approach one another, the reduction in volume of the said enclosed chamber and tending to expel the liquid to the other chamber, and inversely when the two bases mutually separate.

5. An elastic support according to claim 1, wherein at least one of the said paths includes a mass designed to modify the impedance.

6. An elastic support according to claim 1, wherein the second spring means comprises an elastomer member which, viewed in section is outwardly dome-shaped, and which is made up of at least one elastomer element.

7. An elastic support according to claim 6, including an annular shaped mass connected to and surrounding the dome-shaped member at the outer portion of said dome.

8. An elastic support according to claim 6 or claim 7, wherein the dome-shaped member is located outwardly from the flexible wall and forms therewith a deformable chamber.

9. An elastic support according to claim 8, wherein the deformable chamber is completely closed, so that when the two bases of the support approach one another, compression is generated in this chamber which tends to resist outward movement of the flexible wall and encourage inward movement thereof when the bases separate.

10. An elastic support according to claim 8, wherein the deformable chamber is opened to the atmosphere.

11. An elastic support according to claim 10, wherein the flexible wall includes reinforcement means so as to limit the outward movement thereof.

12. An elastic support according to claim 1, including an inertia mass in each of said paths, the assembly of these masses, spring means and the damper device being calculated so as to provide two dynamic dampers capable of being adjusted to different frequencies and the inertia mass of the path containing said first spring means being constituted by said further rigid member.

* * * * *